Sept. 28, 1948.  E. T. NORD  2,450,350
MILLING MECHANISM

Original Filed July 26, 1943  4 Sheets-Sheet 1

INVENTOR.
ERIC T. NORD
BY Saywell and Wessler
ATTORNEYS

Sept. 28, 1948.     E. T. NORD     2,450,350

MILLING MECHANISM

Original Filed July 26, 1943     4 Sheets-Sheet 2

INVENTOR.

ERIC T. NORD

BY

ATTORNEYS

Sept. 28, 1948.     E. T. NORD     2,450,350
MILLING MECHANISM

Original Filed July 26, 1943     4 Sheets-Sheet 3

INVENTOR.
ERIC T. NORD
BY Saywell and Messler
ATTORNEYS

Sept. 28, 1948.   E. T. NORD   2,450,350
MILLING MECHANISM
Original Filed July 26, 1943   4 Sheets-Sheet 4

INVENTOR.
ERIC T. NORD
BY
ATTORNEYS

Patented Sept. 28, 1948

2,450,350

UNITED STATES PATENT OFFICE 2,450,350

MILLING MECHANISM

Eric T. Nord, Amherst, Ohio, assignor to U. S. Automatic Corporation, Amherst, Ohio, a corporation of Ohio Original application July 26, 1943, Serial No. 496,169, now Patent No. 2,381,921, August 14, 1945. Divided and this application June 27, 1944, Serial No. 542,412

2 Claims. (Cl. 90—15)

The invention relates to milling mechanism, and particularly to mechanism of this character adapted automatically to effect certain milling cuts simultaneously on a plurality of small metal work pieces. The improved milling mechanism is one of the units of a milling and marking machine disclosed in U. S. Letters Patent No. 2,381,-921, and the instant application is a divisional one of the application resulting in said Patent No. 2,381,921. The complete operation upon the small work pieces includes, as shown and fully described in said Patent No. 2,381,921, certain periodic indexing movements of a work-holding drum in which the work-pieces are mounted, and a marking of the work pieces with classification or identifying indicia, and an ejecting thereof from the machine, in addition to the milling thereof by the improved milling unit herein particularly shown, described and claimed.

The invention is particularly illustrated in the following description and accompanying drawings as applied to the milling of tubular end-flanged articles known as primer bodies.

The annexed drawings and the following description set forth in detail certain means illustrating the improved milling mechanism, such means constituting, however, only one of the various forms in which the principle of the invention may be embodied.

In said annexed drawings:

Figure 1 is a front elevation of the complete machine by which the milling, as well as the marking and ejecting, is effected;

Figure 2 is a fragmentary plan view, upon an enlarged scale, particularly showing three of a bank of laterally aligned work pieces being subjected to a second of two certain consecutive milling operations, the view showing certain milling cutters in section and indicating a certain rotatable drum and work holders secured thereto in which the pieces are held during the operations effected thereon, the second milling operation indicated being substantially completed, this view being taken from the plane indicated by the line 2—2, Figure 1;

Figure 1:
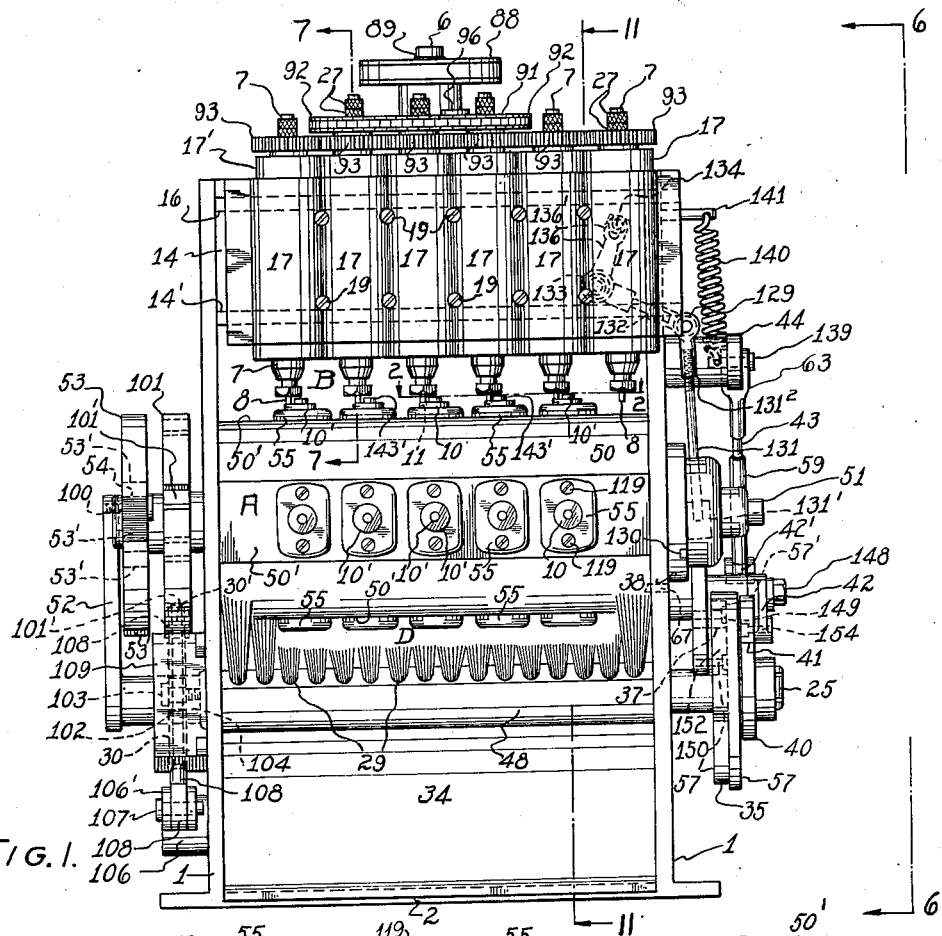
Figure 2:
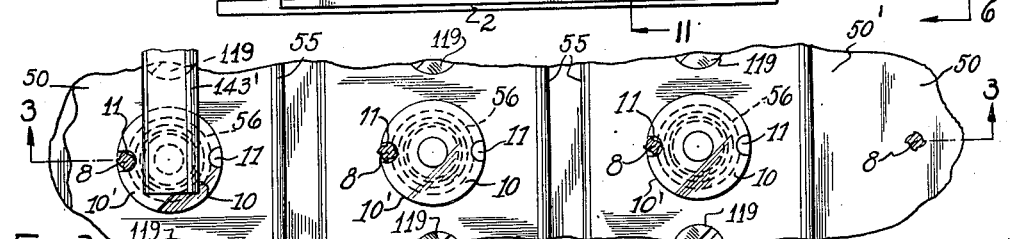
Figure 6:
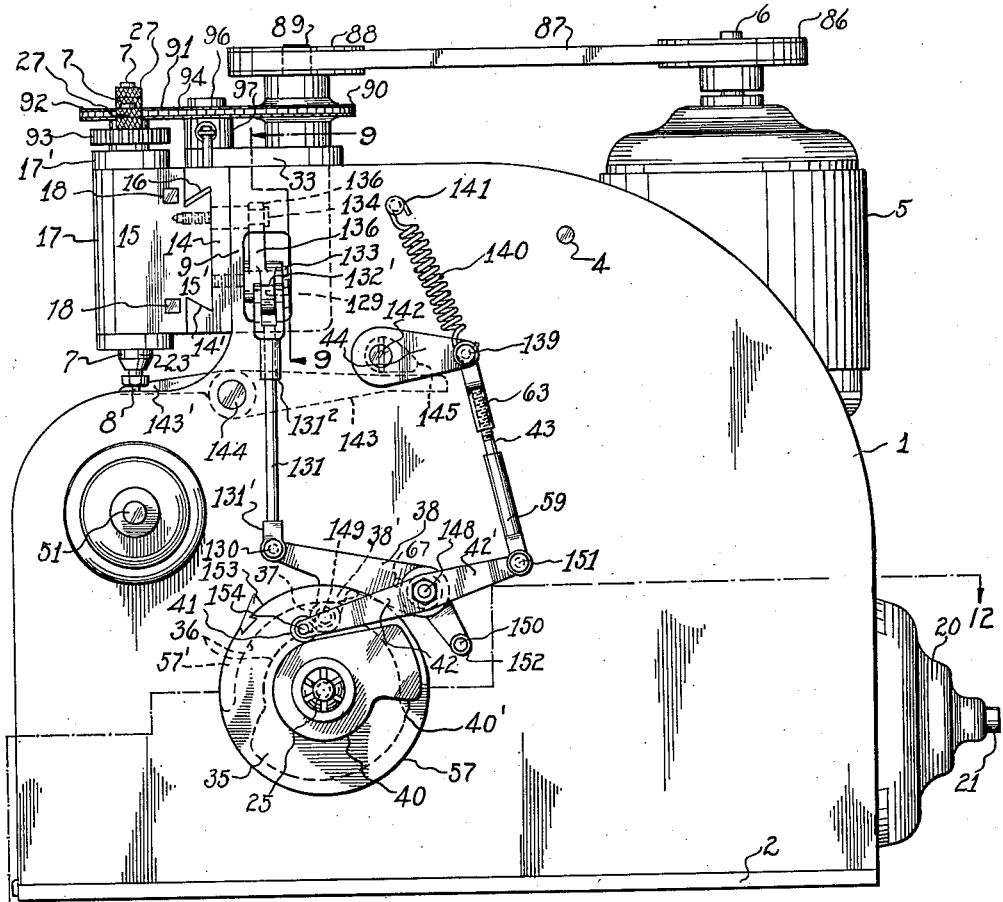
Figure 6 is a right side elevation of the milling and marking machine, taken from the plane indicated by the line 6—6, Figure 1.
Figure 11:
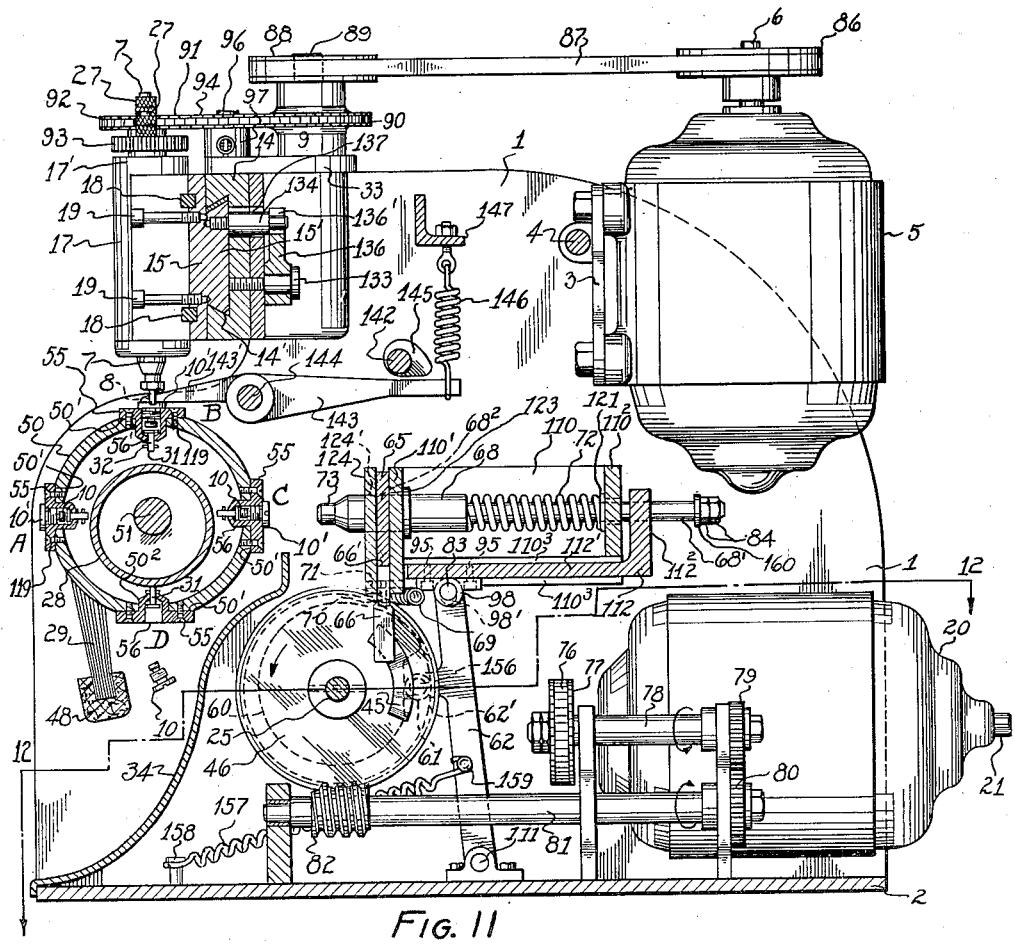
Figure 12:
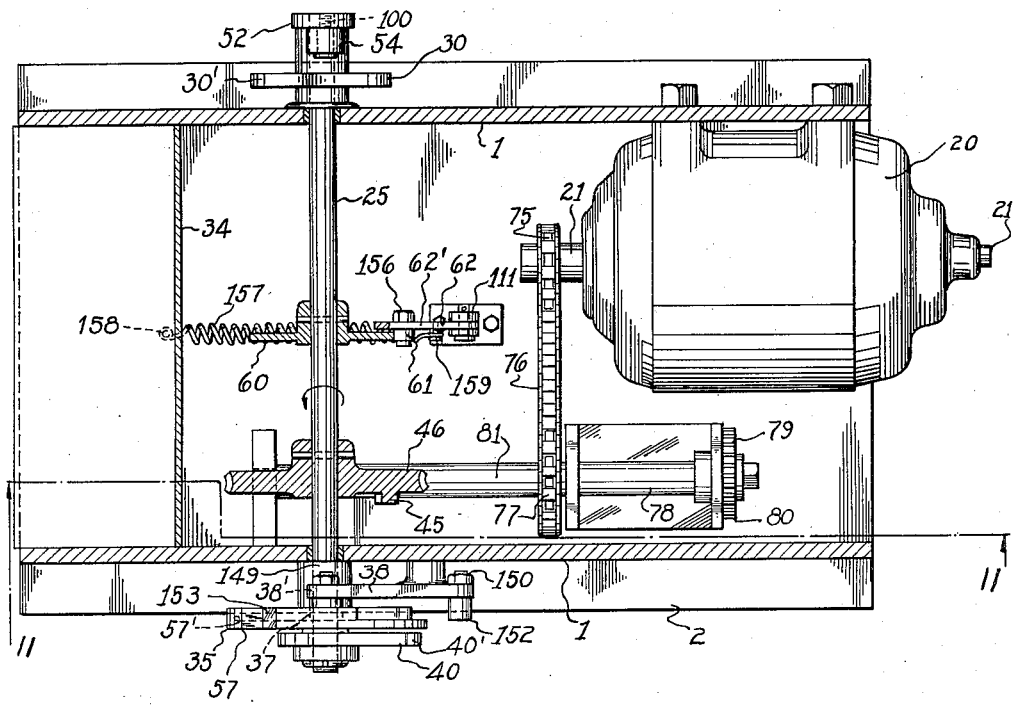

Figure 11 is a vertical longitudinal section of the complete milling and marking machine, taken from the planes indicated by the line 11—11, Figures 1 and 12; and Figure 12 is a plan section of the complete milling and marking machine, taken from the planes indicated by the line 12—12, Figures 6 and 11.

Referring to the annexed drawings in which the same parts are indicated by the same respective numbers in the several views, the main frame of the improved milling and marking machine includes opposed side plates 1 erected upon a base 2. Supported by a bracket 3, Figure 11, pivotally mounted on a transverse shaft 4 supported in the upper portion of the side plates 1 at the rear of the machine is a motor 5, and supported on the lower portion of the left side plate 1, Figures 11 and 12, at the rear of the machine is a motor 20. The motor 5 drives a plurality of rotatable spindles 7, Figures 1, 6, 7, and 11, to effect the desired milling operations, and the motor 20 drives a cam shaft 25, Figures 1, 6, 8, 11, and 12, to which are secured, on the left side of the machine, a lever 52, Figures 1 and 12, for effecting certain indexing movements of a drum 50 upon which the work pieces 10 are mounted, Figures 1, 2, 3, 7, and 11, and a cam 30 for controlling the locking of the drum 50 between indexing movements thereof, Figures 1 and 12; upon the right side of the machine, a cam 35, Figures 1, 6, 8, and 12, for effecting transverse periodic differential movements of the rotatable milling spindles 7, and a cam 40, Figures 1, 6, and 12, for actuating certain work-clamping fingers 143', Figures 1, 2, 3, 6, 7, and 11; and, intermediate the width of the machine, a worm wheel 46, Figures 11 and 12, having a cam portion 45 secured to one face thereof for releasing certain spring-actuated marking plungers 68 from a holding plate, and a cam 69, Figures 11 and 12, for effecting the retraction of the spring-actuated marking plungers 68.

Figure 3:
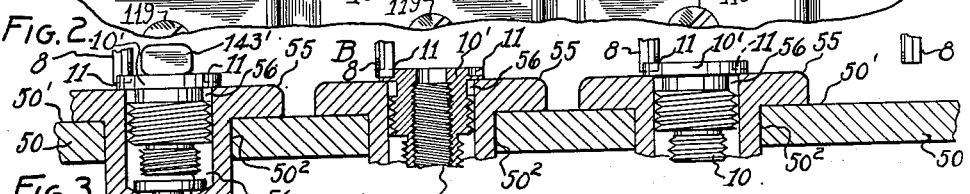
Figure 3 is a fragmentary transverse vertical section, taken in the plane indicated by the line 3—3, Figure 2.

The rotatable drum 50 in which the work pieces 10 are mounted while the milling and marking operations are effected thereon, and which makes one complete rotation while the cam shaft 25 is making four rotations, is formed in its outer surface with four longitudinal plane surfaced recesses 50', Figures 1, 2, 3, 7, and 11, each adjacent two of which are a quadrant apart, in each of which recesses is secured by screws 119 a series of transversely aligned plates 55, five plates 55 to a series, each plate 55 forming a work holder and having a cylindrical hole 56 therethrough aligned with a hole 50² through the adjacent portion of the drum 50 whereby a work piece 10, Figures 2, 3, 4, and 5, can be inserted in said hole 56 with its inner end extended into the interior of the drum 50 and a flange 10' formed on its outer end and limiting its inner movement lying flush at the inner face of the flange with the outer face of the work-holding plate 55, Figures 3 and 11. In order that a freely rotating ejecting tube 28, Figure 11, hereinafter more fully mentioned, shall not roll upon the inner ends of the work piece 10, the plates 55, Figures 3 and 11, are formed with inwardly-extending extensions seated in the holes 50² and having inner-end holes 56' through which extend into the drum interior end-flanged knockout pins 31 provided inwardly of the plate extensions with transverse retaining pins 32.

Figures 4, 5:
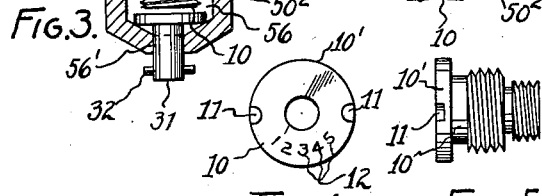
Figure 4 is an end view of one of the work pieces after the complete operations of milling and marking have been effected thereon.
Figure 5 is a side elevation of the work piece shown in Figure 4.

Before describing further detail of the machine assembly, the sequence of operations will be outlined to wit:

A complete cycle of operations comprises the manual filling of one bank of work holders 55 with work pieces 10, a milling of the work pieces 10 upon diametrically opposed portions of the flanges 10' thereof, as indicated by the milling cuts 11, Figures 2, 3, 4, and 5, a stamping of the desired identifying indicia upon the outer faces of the flanges 10', as indicated by the marking 12, Figure 4, and the ejection from the drum 50 of the work pieces 10 thus milled and marked, Figure 11. While one bank of work pieces 10 are being manually inserted in the work holders 55, another bank are being milled, and a third bank are being marked. These operations are effected between indexing movements of the drum 50 and while the latter is stationary. The ejection of the completed work pieces 10 is effected during an indexing movement of the drum 50.

After the various operations have been completed on a bank of work pieces 10, a certain spring-actuated drum-holding plunger 108, Figure 1, is retracted to permit the fourth indexing ninety degree movement of the drum 50 to complete a cycle of its movements. The drum-holding plunger 108 is retracted four times during a complete cycle, i. e., during one complete rotation of the drum 50, and the latted is indexed 90° during each such retraction, i. e., to move each bank of the work holders 55 from one station to the next respective station, which stations will now be particularly described. The fourth indexing movement of the drum 50 carries that bank of work holders 55 secured thereto shown at the bottom in Figures 1 and 11, to a position at the front end of the machine. This front position of the work holders 55 is designated station "A," Figures 1 and 11, and is the position in which a fresh batch of work pieces 10 is loaded manually into a bank of work holders 55. Of course, if the operation of the machine is just being started, station "A" would indicate the position for the start of the first cycle. But, assuming the machine has been previously started, the work holders 55, a quadrant in advance of those shown at station "A" in elevation in Figure 1, are on the top of the drum 50 and are loaded with work pieces 10 which are being milled. This position is designated as station "B," Figures 1 and 11. The work holders 55, 180° in advance of those shown in elevation in Figure 1, and also loaded with work pieces 10, are at the rear of the drum 50 shown in Figures 1 and 11 and diametrically opposed to the work holders shown at station "A" in elevation in Figure 1. This position is designated station "C" and is the station at which the work pieces 10 are marked and is particularly shown in Figure 11. The work holders 55 a quadrant to the rear of the work holders 55 at station "A" shown in elevation in Figure 1 are at the bottom of the drum, indicated as station "D," Figures 1 and 11, and in moving to this bottom position there has been ejected therefrom, as illustrated in Figure 11, the work pieces 10 which have been milled and marked at stations "B" and "C," respectively. These several operations comprise a complete cycle of operations.

Various portions or cooperative assemblies of the machine will now be described.

The detail of the drive by which the cam shaft 25 is actuated from the motor 20 comprises, Figures 11 and 12, a sprocket 75 secured to the shaft 21 extended from the casing of the motor 20 and engaged by a chain 76 which also engages a sprocket 77 secured to and adjacent one end of a longitudinal shaft 78 to whose other end is secured a gear 79 engaging a gear 80 secured to and adjacent one end of a parallel longitudinal shaft 81 adjacent whose other end is secured a worm 82 engaging a worm wheel 46 secured to the cam shaft 25.

The detail by which the rotatable spindles 7, in whose lower ends depending milling cutters 8 are secured, Figures 1, 6, 7, and 11, are driven from the motor 5, comprises a pulley 86, Figure 11, secured to the shaft 6 extended from the casing of the motor 5 and engaged by a longitudinally-extended belt 87 which also engages a pulley 88, Figures 1, 6, and 11, secured adjacent the top of a vertical shaft 89, to which shaft 89 is also secured adjacent its bottom end a sprocket 90 engaged by a chain 91 which also engages a pair of transversely spaced sprockets 92, Figures 1, 6, 7, and 11, the chain 91 between the sprocket 90 and the sprockets 92 also engaging an idler take-up sprocket 94, Figures 6 and 11, rotatably mounted upon a pin 96 mounted in a bracket 97 slidable on a transverse top frame member 33 extended between the side plates 1. The sprockets 92 are secured to two of the rotatable spindles 7, the second and fourth, reading from the left, Figure 1. There are six of these spindles 7. Each of these spindles 7 is provided with a gear 93 rotatably fixed thereto adjacently below the horizontal plane of the sprockets 92, Figure 7, and each adjacent two of these gears 93 are rotatably engaged, so that all six of the rotatable spindles 7 are rotated from the two sprockets 92. It may be stated that the reason for having six rotatable spindles 7 for milling a bank of five work pieces 10 is that the work pieces 10 are each milled upon diametrically opposite portions of the flanges 10' thereof, Figures 2 and 4, and the milling of any one work piece 10 is effected by an adjacent two of the milling cutters 8 which, between consecutive milling operations, are shifted laterally of the machine a distance substantially equal to the distance between the milled recesses of adjacent work pieces 10, so that the intermediate four milling cutters 8 each performs two milling operations, one each upon two adjacent work pieces 10, and the two end milling cutters 8 each performs one milling operation, and that operation is upon the outside of the two respectively adjacent end work pieces 10, the outside milling cutters 8 running respectively idle while the milling operations are being effected upon the inside portions of the respective two end work pieces 10. This action will be clearly seen in Figure 1 in which the right-hand end milling cutter 8 is running idly while the other five milling cutters 8 are effecting milling operations upon the left sides of the five respective work pieces 10. The milling cutters 8 run continuously during the operation of the machine, being spaced about midway between milling positions during the indexing movements of the drum 50, as hereinafter fully explained.

The detail by which the indexing of the drum 50 is effected comprises, Figure 1, transversely opposed spaced disks 53 and 101 which are secured adjacently exterior of the left-hand side plate 1 to the transverse shaft 51 to which the drum 50 is secured, of which disks 53 and 101 the disk 53 is the outer one and is formed with four obliquely arranged slots 53' which pass entirely through the body of the disk 53, and whose outer ends are open at the periphery of the disk 53, the axes of these slots 53' at these outer ends being a quadrant apart. These slots 53' are adapted to receive a roller 54, Figures 1 and 12, rotatably mounted upon a pin 100 mounted in the outer end of an actuating arm 52 whose inner end is secured to the cam shaft 25. The pressure of the roller 54 upon the walls of the slots 53' effects the indexing movements of the drum 50. During the non-indexing or dwell periods of the drum 50, it is positively locked by the engagement of a spring-actuated holding plunger 108 with certain peripheral recesses 101' formed in the inner disk 101 which, as before stated, is also secured to the drum shaft 51. These peripheral recesses 101' are four in number and the axes of each adjacent two are a quadrant apart. These recesses 101' of the disk 101 are correlated to the slots 53' of the disk 53 but are respectively slightly in advance of the slots 53' insofar as the rotative path of the drum 50 is concerned. Therefore, by means now to be described, the spring-actuated plunger 108 is withdrawn from the recess 101' which it engages just previously to the entrance of the roller 54 into a slot 53' to effect an indexing movement of the drum 50. This retraction of the spring-actuated holding plunger 108 is effected by the high portion 30' of the cam 30, Figures 1 and 12, secured to the shaft 25, which cam portion 30' engages a roller 102 mounted in one arm 104 of a bell crank lever pivotally mounted upon a pin (not shown) and whose other arm 106 is pivotally connected to the plunger 108 by a pin 107. The plunger 108 normally is urged toward the disk 101 by a spring (not shown) and the effect of the pivotal movement of the bell crank lever under the action of the portion 30' of the cam 30 is to retract the plunger 108 away from the disk 101 and against the impulse of the spring.

The spring-actuated plunger 108 is permitted by the cam 30 to be moved inwardly of the disk 101 to engage a slot 101' when the indexing movement of the drum 50 by the action of the roller 54 on the arm 52 engaging a slot 53' has moved the axis of a slot 101' approximately into alignment with the axis of the plunger 108, the roller 54 at substantially the same time passing out of the slot 53' with whose wall it has been engaged, which slot 53' is angularly adjacent to the rear of the recess 101' which is about to be engaged by the plunger 108, thus stopping the indexing movement of the drum 50 and holding the latter stationary.

Each revolution of the cam shaft 25 effects one withdrawal of the spring-actuated plunger 108 and one engagement of the roller 54 on the arm 52 with a slot 53' of the disk 53 to effect a ninety degree indexing movement of the drum 50.

Figure 8:
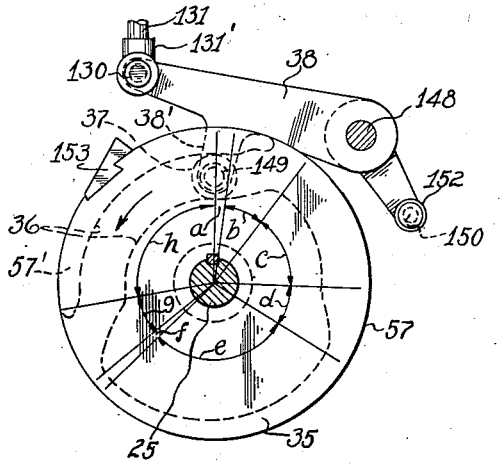
Figure 8 is an enlarged side elevation of a certain cam and associated mechanism detached from the machine, which elements control various differential, periodic movements of certain milling spindles in which are mounted the milling cutters.

The detail whereby the milling cutters 8 are moved crosswise in both directions to effect milling operations upon diametrically opposed portions of the work pieces 10, which milling mechanism is the particular subject matter claimed in the instant application, comprises, Figures 1, 6, 8, 9, 10, and 11, the cam 35 secured to the cam shaft 25 a spaced distance from and somewhat exteriorly of the right-hand side plate 1, together with cooperating mechanisms including a roller 37 engaging the cam 35, Figures 6 and 8, this cam 35 being a grooved cam whose grooved portion is marked "36," and an outer diametrically enlarged plate or side face of the cam is indicated by "57," Figures 1, 6, and 8. The cam plate 57 is formed with a laterally-directed peripheral extension 57', clearly seen in Figures 1 and 8, which defines the groove 36 and whose inner surface conforms to the opposed portions of the effective roller-engaging surface of the cam 35.

The roller 37 is indicated in Figures 6 and 8 in the position in which the second and final milling operation is substantially completed and the milling cutters 8 are about to be moved into their respective central or neutral positions preliminarily to a dwell period within which an indexing movement of the drum 50 through a quadrant will be effected. Using the position of the roller 37 indicated in Figures 6 and 8 as a starting point, a complete cycle of operations will now be described:

First, a short dwell period during a small arc movement of the cam 35, indicated by "a," Figure 8, then a comparatively rapid movement of the milling cutters 8 to central or neutral positions relative to the adjacent work pieces 10, during an arc movement of the cam 35, indicated by "b," then a dwell of the milling cutters 8 at the central or neutral positions for a certain arc movement of the cam 35, indicated by "C," while an indexing movement of the drum 50 is being effected, then a comparatively rapid non-cutting movement of the milling cutters 8 transversely in one direction to points adjacent the portions upon one side of the respective adjacent work pieces 10 which are to be milled, during a certain arc movement of the cam 35, indicated by "d," then a comparatively slow transverse cutting movement of the milling cutters 8 in the same direction to effect the milling operation upon said portions of the flanges 10' of the work pieces, during a certain arc movement of the cam 35, indicated by "e," then a short dwell period during a small arc movement of the cam 35, indicated by "f," then a comparatively rapid movement of the milling cutters 8 in the opposite direction to positions adjacent the other side portions of the adjacent work pieces 10 which are to be milled, through an arc movement of the cam 35, indicated by "g," when the roller 37 drops into the groove 36, then a comparatively slow movement of the milling cutters 8 in the same direction to effect the second milling operation upon the flanges 10' of the work pieces 10, through an arc of cam movement indicated by "h," at which point a cycle has been completed insofar as a description of all parts thereof is concerned, although, as before stated, this particular described cycle was commenced at the end of the second milling operation inasmuch as the cam roller 37 in Figures 6 and 8 is shown at that point.

It will be understood that the movements of a milling cutter 8 just described result in any one milling cutter, with the exception of the right and left hand milling cutters of the six milling cutters, effecting one milling operation upon each of two adjacent work pieces 10, upon the left-hand side of one work piece and the right-hand side of the adjacent work piece. This action will be clearly understood from an inspection of Figure 1. One of the end milling cutters 8 runs idly during each one of these milling periods, the right-hand end milling cutter 8 in Figure 1 running idly when the other five cutters are working upon the left-hand sides of the five work pieces 10, and the left-hand cutter 8 in Figure 1 running idly when the other five cutters are working upon the right-hand sides of the work pieces 10.

Figures 9, 10:
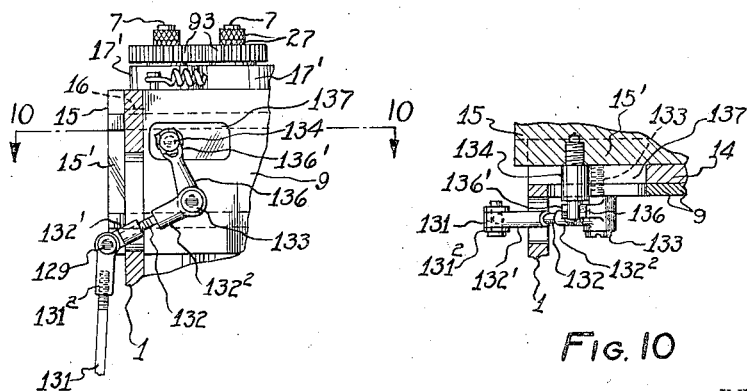
Figure 9 is a fragmentary transverse vertical section, looking toward the front of the machine, the view being taken from the planes indicated by the line 9—9, Figure 6.
Figure 10 is a fragmentary horizontal section, taken on the plane indicated by the line 10—10, Figure 9.

The cam roller 37 is rotatably mounted upon a pin 149, Figures 6 and 8, this pin 149 being fixed, interiorly of the cam 35, in a short dependent extension 38' of an angular rock arm 38 and intermediate the ends of one portion of the latter, which arm 38 is pivotally mounted on a pin 148, the end of this portion of the arm 38 being pivotally connected with a pin 130 with which is also pivotally connected the socketed hub 131' of an upwardly extending link 131, Figures 1, 6, and 9, which at its upper end is threaded in a socketed hub 131² pivotally secured to a socketed hub 132' by a pin 129 upon which both of hubs 131² and 132' are pivoted and in the latter of which hubs is secured one end of a rod 132 whose other end is secured in a socketed hub 132², Figures 9 and 10, pivotally mounted upon a screw 133 secured in a rear frame member 9 and a slide backing 14, the hub 132² forming with a lever extension 136 a rocker arm having a forked end 136'. The socketed hub 132' and the rod 132 pass through an opening formed in the right-hand frame member 1. The forked end 136' engages a bolt 134 secured to and seated in an extended portion 15' of a slide 15, Figures 1, 7, and 10, in which the rotatable spindles 7 are mounted. The bolt 134 passes through the slide backing 14 formed with an opening 137 for the play of the bolt 134. The slide portion 15', Figures 6, 7, 9, and 10, is a rear dove-tailed sliding portion which engages a complementary portion 14' formed upon the inner face of the slide backing 14. The latter is secured to the frame member 9 by screws 74, Figure 7, at the rear of the top portion of the machine immediately to the rear of the rotatable spindles 7. A gib 16 is provided at the top between the adjacent sliding surfaces of the members 14' and 15'. Thus, due to the contour of the effective surface formed upon the cam 35, the spindles 7 and hence the milling cutters 8, are traversed transversely of the work pieces 10 in the manner and in the sequence hereinbefore mentioned.

The other portion of the angular rock arm 38, Figures 6 and 8, extends downwardly and supports a roller 152 rotatably mounted on a pin 150 located at the lower end of the downward extension of this rock arm portion. A directing lug 153 extended outwardly from the cam plate 57 tilts the rock arm 38 by means of the roller 152 and positively forces downwardly the short dependent extension 38' of the rock arm 38 and, hence, the roller 37, so that the latter is directed into the groove 36 during the arcuate cam movement "g." The friction of the sliding portion 15' of the slide 15, Figure 7, in the dove-tailed slideway 14' of the backing 14 is sufficient to maintain the cam roller 37 in intimate contact with the high part of the cam 35 and to prevent the roller 37 from moving away from the high part of the cam.

Figure 7:
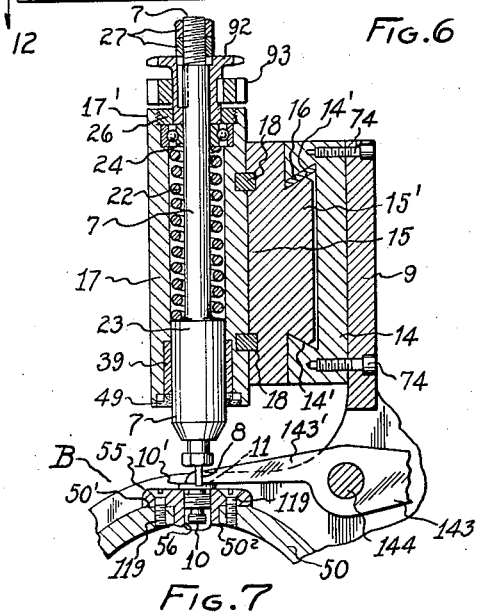
Figure 7 is a fragmentary vertical longitudinal section, upon an enlarged scale, taken from the plane indicated by the line 7—7, Figure 1.

The transversely movable slide 15 in which the rotatable spindles 7 are mounted is a multiple-part member consisting of the main slide portion 15 and the plurality of spindle housings 17, Figure 7, which are aligned with the main slide portion 15 by keys 18. Furthermore, the spindle housings 17 are secured to the slide portion 15 by bolts 19, Figures 1 and 11, which pass through adjacent contacting portions of the annular housings 17 and are threaded in the main slide portion 15. Surrounding the upper stem portions of the spindles 7, Figure 7, are compression springs 22 which bear at their lower ends against lower enlarged sliding abutment portions 23 of the spindles 7 and at their upper ends against fixed ball races 24. These ball races 24 are fixed by threaded collars 26 which engage upwardly-extending flanges 17' of the spindle housings 17. Sleeve liners or bushings 39 are provided for the enlarged spindle abutment members 23; as also, oil seals 49.

Certain adjustments of the machine elements are provided as follows:

The transverse strokes of the rotatable spindles 7 may be varied by adjustments of the link 131 and the rod 132, Figures 1, 6, and 9, which, it will be noted, are of turnbuckle construction by reason of their threaded engagement at least at one of their two ends with the socketed hub members 131' and 131² and socketed hub members 132' and 132², respectively. The depth of the milling cuts can be varied by adjustments of nuts 27, 27, Figure 7, engaging the tops of the spindles 7 and bearing upon the hubs of the sprockets 92 or gears 93. The stroke of the holding-finger-releasing cams 45 can be varied by an adjustment of the link 43, Figure 6, which has screw-threaded engagement at least at one of its two ends with the socketed hub members 59 and 63.

Means are provided whereby the work pieces 10 are clamped in the work holders 55 when they are in the milling position. This action is effected by clamping finger portions 143' of longitudinal rocker arms 143 mounted upon a transverse shaft 144, Figures 1, 2, 3, 6, and 11, the rear end body portion of the rocker arms 143 being controlled by vertical springs 146, Figure 11, so as to cause the clamping fingers 143' normally to bear down upon the flanges 10' of the work pieces 10. One end of each spring 146 is secured to an angle 147 mounted upon and extended between the side plates 1 and the other end to the rear end of a rocker arm 143. In order to effect the release of the work pieces 10 from the holding pressure of the fingers 143', when one bank of work pieces 10 is leaving and the following bank of work pieces 10 is entering the milling station B at the top of the drum 50, a cam 40, Figures 1, 6, and 12, is secured to the cam shaft 25 adjacently exterior of the milling cam 35 and is engaged by a roller 41 pivotally mounted upon a pin 154 which is secured in one end portion 42 of a rocker arm, the other end portion 42' of which pivotally supports a pin 151. Intermediate its ends the rocker arm 42—42' is pivotally mounted upon the pin 148. Upon the pin 151 is also pivotally mounted a link consisting of a socketed hub 59 formed with a threaded extension 43 engaged at its opposite end in a tapped hub 63 pivotally secured by a pin 139 to an end portion of a rocker arm 44 pivotally mounted adjacent its opposite end upon a transverse shaft 142 to which is secured a series of rocker cams 145 disposed adjacent the bodies of the respective rocker arms 143 but normally slightly spaced therefrom. However, when an extended portion 40' of the cam 40, Figure 6, is engaged by the roller 41, the arm 44 is rocked to cause the cams 145 to bear upon the clamping arms 143 to rock the same against the action of the springs 146, Figure 11, and thus lift the clamping fingers 143' upwardly away from the flanges 10' of the work pieces 10. Normally the cams 145 are held in non-effective position relative to the rocker arms 143 by a tension spring 140, Figures 1 and 6, secured at one end to the pin 139. The other end of the spring 140 is secured to a pin 141 mounted in and projecting from the adjacent side frame member 1.

The means for stamping the work pieces 10 with the identifying indicia 12, Figure 4, at station "C," Figure 11, of the rotatable drum 50 are shown in Figures 11 and 12. This subject matter is particularly shown, described, and claimed in U. S. Letters Patent No. 2,420,613, upon Work marking assemblies for machine tools, which resulted from a divisional application of the aforementioned Patent No. 2,381,921. The stamping is done by spring-actuated longitudinal plungers 68, one plunger for each of the work holders 55 in a bank of work holders, these plungers 68 having rear stem portions 68' and being provided at their front ends with dies 73 suitable for embossing the desired identification 12, such as shown in Figure 4. The plungers 68 are slidably mounted in the front plate 110' of a fixed bed member 110, and the stem portions 68' thereof are slidably mounted in the rear plate 110² of the bed member 110 and also in the vertical leg 112² of a longitudinally movable angular member 112 having a longitudinal base portion 112' slidable on inwardly extending base flanges 110³ of bed 110. In the normal retracted position of the springs 72 shown in Figure 11, the vertical leg 112² of the angular member 112 is disposed adjacently rearwardly of and substantially parallel with the rear plate 110² of the bed member 110. The compression springs 72 are mounted in the bed 110 around the plunger stems 68' between the rear abutment face of the plungers 68 and the inside rear face of the rear bed plate 110². The springs 72 are under compression when the longitudinally-movable plungers 68 are in their rear position, Figure 11, but, when these springs 72 are free to act, they drive the plungers 68 rapidly forwardly to cause the die portions 73 thereof to make the desired marking upon the flanges 10' of the work pieces 10 mounted in the work holders 55 at the station "C."

Means are provided for normally holding the plungers 68 in their rearmost position and thus maintaining the springs 72 under compression, and such means include a transversely movable plate 65 adapted to engage with notches (not shown) formed in the left side of the plungers 68. When the movable plate 65 is shifted to the left, the plungers 68 are released and are free under the impulse of the springs 72 to effect their marking function. The plate 65 is transversely movable between the side plates of the bed member 110, and a free space (not shown) between the left side plate of the bed member 110 and the left edge of the plate 65 is provided into which the plate 65 can be shifted during its disengaging movement.

The means for shifting the plate 65 to the left to disengage it from the plunger notches include a trigger 66, Figure 11, lying in the path of movement of a beveled cam portion 45 provided upon the right-hand face of the worm wheel 46, Figures 11 and 12, secured to the shaft 25. This trigger 66 is pivoted intermediate its ends on a pin 71 mounted in a support plate 124 for the plunger-holding plate 65 and lying flush at its rear face with the front face of said holding plate 65, the trigger 66 having an upper nose portion 66' which engages the holding plate 65 adjacent the right-hand edge of the latter, thus moving the holding plate 65 to the left when the trigger 66 is tripped by the cam portion 45, which action is timed to take place when the work pieces 10 are at the station "C" in position for the marking operation. As soon as the cam portion 45 passes the trigger 66, by which time the plungers 68 have been retracted as hereinafter described, the holding plate 65 is moved to the right into engaging position with the notches formed on the left side of the plungers 68, by a spring 69, Figure 11, secured at one end to a pin 70 depending from the base of the plate 65 and at its other end to a pin 67, Figures 1 and 6, secured in the right-hand frame member 1.

The retraction of the plungers 68 to effect the compression of the springs 72, and to permit the right-hand edge of the plunger-holding plate 65 to be brought into alignment with the notches formed upon the left-hand side of the plungers 68 is effected from a cam 60, Figures 11 and 12, secured to the shaft 25, which cam 60 is engaged by a roller 61 rotatably mounted on a pin 156 fixed in a short rearwardly extending ear 62' of an actuating lever 62 pivoted at its lower end upon a pin 111 mounted on the base 2, the lever 62 having a loose pivotal connection at its upper end with a pin 83 secured in opposed ears 98' of a bracket 98 fastened by screws 95 to the under face of the base 112' of the angular member 112. As soon as the roller 61 is released from the high point of the cam 60, i. e., as soon as the plungers 68 are fully retracted and the springs 72 compressed, and the plungers 68 locked by the movement to the right of the holding plate 65, the lever 62 and, hence, the angular member 112 is pulled forwardly, into the positions shown in Figure 11, by a tension spring 157 secured at one end by a pin 158 to the base 2 and at its opposite end to a pin 159 mounted in the lever 62. The rearward retracting movement of the plungers 68 is effected by the pressure of the vertical leg 112² of the angular member 112 upon rear abutment members 160 secured to the plunger stems 68', and the action of the tension spring 157 eases off the leg 112² from the abutments 160, without effecting any movement of the plungers 68, so that the final relative positions of the several parts are those indicated in Figure 11. The abutments 160 are fixed, but they are adjustably fixed by means of nuts 84, and this adjustment is so made that the stroke of the plungers 68 during their marking action does not cause the abutments 160 to contact the leg portion 112² of the angular member 112. Annular metal bushings 121 are driven into or otherwise fastened in the rear bed plate 110², and annular bushings 123 are likewise fastened in the front bed plate 110'. These bushings 121 and 123 provide sliding surfaces, respectively, for the plunger stems 68' and the plunger bodies 68. A key (not shown) is fixed in the bore of the bushing 123 and engages a keyway formed in the plunger 68 whereby the plunger 68 is rotatably fixed so that the location of the marked indicia 12, Figure 4, on the work piece 10 may be controlled. As clearly appears in Figure 11, the plunger body 68 and plunger stem 68' are slidably mounted in the support plate 124, in the plunger-holding plate 65, and in the leg member 112² of the angular member 112, in addition to being provided sliding surfaces through the fixed bed plate 110 by the annular metal bushings 121 and 123, the holes through the plunger-holding plate 65 providing such sliding movement of the plungers 68 being enlarged and of a generally elliptical formation to provide for the relative transverse movements of the holding plate 65 relative to the plungers 68.

The ejecting of the milled and marked work pieces 10, while the drum 50 is making its third indexing movement, between the stations C and D, Figure 11, is effected by a cylindrical tube 28 which rolls freely within the chamber of the drum 50 and tends to stay on the bottom of the drum 50 by gravity as the latter rotates. Inasmuch as the inner ends of the knock-out pins 31, Figures 3 and 11, extend into this drum chamber and are freely movable through the work-plate extension holes 56' and their flanged ends can engage the inner ends of the work pieces 10 within the extended portions of the work holders 55, the weight of the tube 28 moves the knock-out pins 31 against the inner ends of the work pieces 10 and ejects them from the work holders 55 and outwardly of the drum 50 whence they are directed by a guard or chute 34, Figure 11, outwardly of the machine.

In order that the surfaces of the work holders 55 may be kept clear of chips, grit or other obstructions, an upwardly-extended flexible brush 29, Figure 11, seated at its base in a transversely extended frame member 48 plays at its upper end over these work holder surfaces as the drum 50 is rotated.

What I claim is:

1. Milling mechanism having a frame formed with a sliding surface, a milling head formed with a cooperating sliding surface, a rotatable milling spindle mounted in the head, means for rotating the spindle, a shaft rotatably mounted in the frame and means for rotating the same, a plate secured to the shaft and having a flange formed with a roller groove, the flange having a cam surface with a low part forming a wall of the groove, a roller engaged by the cam, a pivotal support for the roller in which it is rotatably mounted, and connections between said support and the milling head effecting reciprocatory sliding movements of the latter, the milling head engaging the frame with frictional resistance to sliding movement sufficient to maintain the roller in intimate contact with the high point of the cam, and cooperating means mounted on the plate and the roller support for positively directing the roller into the groove.

2. Milling mechanism having a frame, a milling block slidable therein, a plurality of spaced rotatable milling spindles mounted in the block, means for rotating the spindles, a shaft rotatably mounted in the frame and means for rotating the same, a plate secured to the shaft and having a segmental peripheral laterally-extended flange, the plate being formed with a laterally-projected cam surface portion lying, in part, within and under the peripheral flange segment, a roller engaging the cam surface, a laterally-extended pin upon which the roller is rotatably mounted, a support in which the pin is mounted, an outwardly-projected lug secured to the periphery of the plate, a pivotal mounting for the support, a second roller rotatably mounted in the support on one side of the pivotal mounting and adapted to be engaged by the lug, and connections secured to the support upon the opposite side of the pivotal mounting and associated with the milling block to impart to the latter reciprocatory sliding movements.

ERIC T. NORD.

REFERENCES CITED

The following references are of record in the file of this patent:

UNITED STATES PATENTS

| Number | Name | Date |
| --- | --- | --- |
| 319,429 | Smith et al. | June 2, 1885 |
| 1,216,018 | Trundle | Feb. 13, 1917 |
| 1,494,377 | Schmidt | May 20, 1924 |
| 2,353,480 | Marsilius | July 11, 1944 |